July 3, 1934.   C. W. SINCLAIR   1,965,204
VEHICLE WHEEL
Filed Aug. 18, 1930
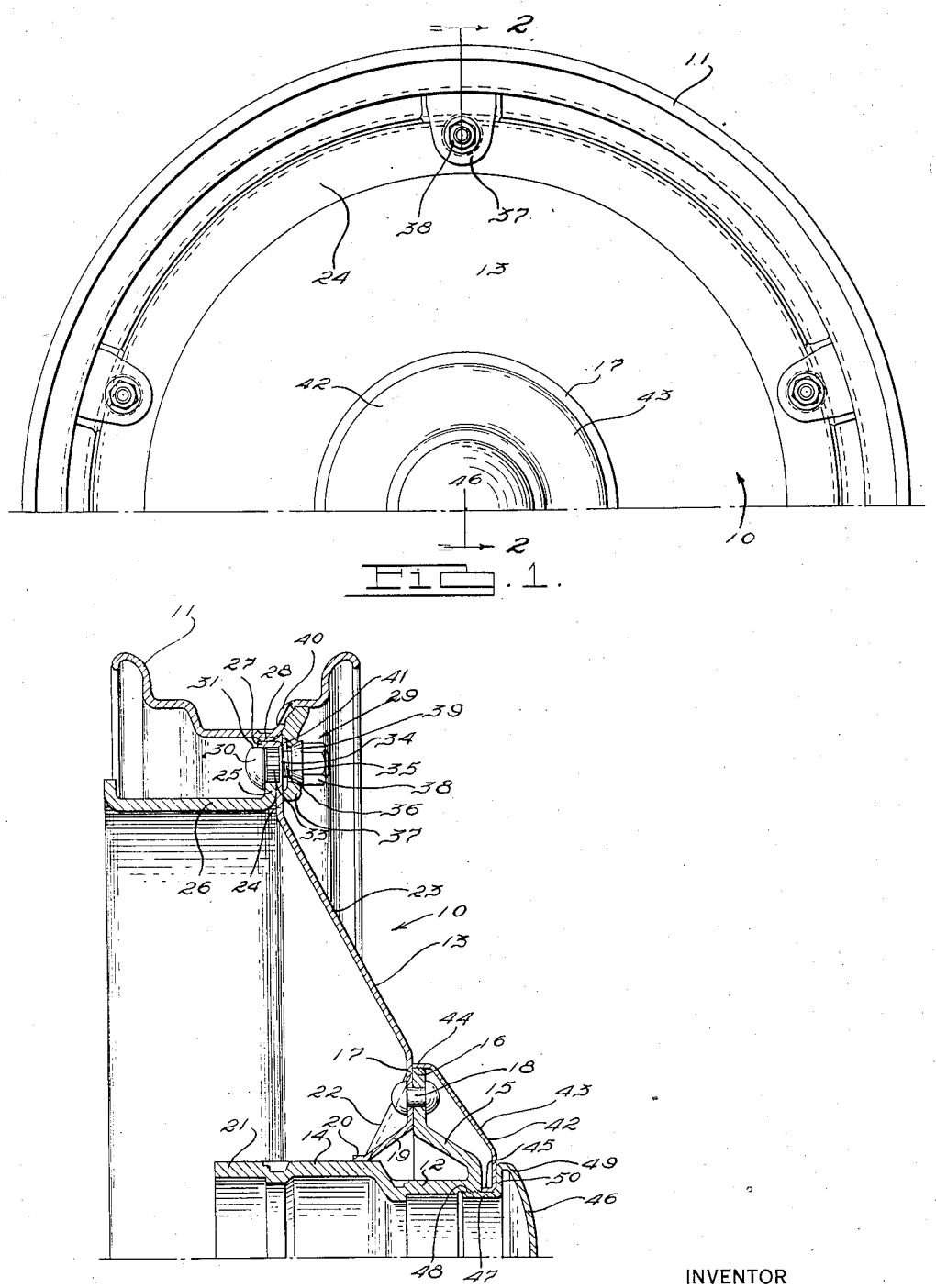
INVENTOR
Charles W. Sinclair.
BY
ATTORNEY Patented July 3, 1934

1,965,204

UNITED STATES PATENT OFFICE 1,965,204

VEHICLE WHEEL

Charles W. Sinclair, Detroit, Mich., assignor to Kelsey-Hayes Wheel Corporation, Detroit, Mich., a corporation of New York Application August 18, 1930, Serial No. 476,198

2 Claims. (Cl. 301—63)

This invention relates to vehicle wheels and has as one of its objects to cheapen the cost of manufacture and facilitate assembly by simplifying the construction of the several parts involved and by reducing the number of such parts to a minimum.

The invention provides for reducing the number of parts and cheapening the cost of manufacture by providing a wheel assembly wherein common fastening means is utilized for securing the brake drum, disk and rim together as a unit.

A further advantageous feature of the present invention resides in the provision of a vehicle wheel of the type specified above wherein the tire carrying rim is demountably secured in place by the fastening means aforesaid and wherein means is provided for reinforcing the inner portions of the wheel body member.

With the foregoing as well as other objects in view, the invention resides in the peculiar construction of the wheel which will be made more apparent as this description proceeds, especially when considered in connection with the accompanying drawing, wherein:

Figure 1 is a fragmentary side elevational view of a vehicle wheel constructed in accordance with this invention; and Figure 2 is a sectional view taken on the line 2—2 of Figure 1.

Referring now to the drawing, it will be noted that there is illustrated in Figures 1 and 2 a vehicle wheel 10 of the disk type having a demountable semi-drop center rim 11 and having a hub 12 arranged concentrically within the rim and connected to the latter by means of a disk wheel body member 13. The hub 12 is preferably of one piece construction having a barrel portion 14 provided at the front end thereof with an upwardly and rearwardly extending portion 15 terminating in a radial attaching flange 16. The flange 16 is positioned substantially forwardly of the front edge of the rim 11 and embraces the disk wheel body member 13 at a point spaced outwardly from the inner circumferential edge of the disk member for reinforcing the latter. The portions 17 of the disk, engaged by the fixed flange 16, are arranged in a plane substantially parallel to the plane of the wheel and are provided with a plurality of circumferentially spaced openings therein registering with corresponding openings in the fixed flange for receiving suitable fastener elements 18 which serve to rigidly secure the fixed flange to the disk wheel body member. The inner circumferential edge portions 19 of the disk member 13 are flared inwardly from the portions 17 and terminate in an annular flange 20 adapted to seat upon an enlarged portion 21 of the barrel at a point spaced rearwardly from the fixed flange 16 of the hub.

In order to reinforce the inner edge portions 19 of the disk member 13, the latter portion, together with the portion 17, are bent inwardly at circumferentially spaced points to form ribs 22. As shown in Figure 2, the ribs 22 extend diagonally from the annular flange 20 to the outer portions of the radially extending part 17 of the disk. The intermediate portion 23 of the disk 13 is inclined rearwardly and outwardly from the points of connection of the ribs 22 with the disks and is provided with a radially extending flange 24 adjacent the outer edge thereof for embracing the front side of a flange 25 extending outwardly from the forward end of the brake drum flange 26. The radial portion 24 terminates in an axially extending annular flange 27 overlapping the outer edge of the flange 25 and engaging the base of the rim 11 to form a seat therefor. The flange 27 and cooperating engaging part of the rim 11 are provided with cooperating interengaging portions 28 for effecting a driving connection between the rim and wheel body member 23.

The flange 25 extending from the brake flange 26 is secured to the radial portions 24 of the disk member 23 at circumferentially spaced points by means of a plurality of fastener elements 29 permanently carried by the flange 25 and disk, and having portions for demountably securing the rim 11 in position. As shown particularly in Figure 2, the fastener elements 29 are provided with head portions 30 engaging the rear surface of the flange 25 and formed with substantially flat sides 31 engaging the inner surface of the flange 27 to prevent rotation of the fastener elements relative to the flange 25 and disk member 23. The fastener elements are further provided with serrated shank portions 33 extending through aligned openings formed in the flange 25 and radial portions 24 of the disk member. The serrated portions 33 of the fastener elements terminate in annular shoulders 34 of greater diameter than the openings aforesaid in the flange 25 and radial portion 24 for engaging the front side of the latter and cooperate with the heads 30 to prevent axial movement of the fastener elements relative to the flange 25 and disk member 23. Extending forwardly from the shoulders 34 of the fastener elements are suitable threaded shank portions 35 adapted to extend through openings 36 formed in the lugs 37 extending inwardly from the rim 11. Suitable nuts 38 are adapted to be threaded upon the portions 35 of the fastener elements and are provided with conical shoulders 39 adapted to engage correspondingly shaped seat portions in the front side of the lugs 37 to urge the same, together with the rim, rearwardly for properly positioning the rim upon the flange 27. The lugs 37 are permanently secured as at 40 to the front side of the rim and the rear surfaces of the inwardly extending portions thereof are countersunk as at 41 to provide for rigidly clamping the rim in place. Thus, from the foregoing it will be observed that I have provided common securing means for rigidly clamping the peripheral portions of the brake drum flange and disk wheel body member together as a unit and for demountably securing the tire carrying rim in position upon the wheel body member.

In order to enhance the general appearance of the wheel, I provide means in the form of an annular cover plate 42 for concealing the portions of the hub 14 extending beyond the front side of the disk wheel body member 13. The annular cover plate 42 is formed with an intermediate portion 43 inclined in a direction corresponding to the inclination of the intermediate portion 23 of the disk member 13 and forming in effect a continuation thereof so as to impart a frusto-conical effect to the wheel body. The outer portion of the cover plate 42 terminates in an axially extending annular flange 44 adapted to overlap the outer edge of the fixed flange 16 on the hub for concealing both the reinforcing ribs and the fixed flange. The inner edge of the annular cover plate 42 terminates in a rearwardly and axially extending flange 45 adapted to be clamped into engagement with the forward end of the hub 12 by means of a hub cap 46 in the manner to be presently described. The hub cap 46 is provided with a barrel portion 47 forming a seat for the annular flange 45 and threadedly engaging the front end of the hub as at 48. The hub cap 46 is further provided with an enlarged closed end portion 49 forming a radial shoulder 50 adapted to overlap and embrace the inner portions of the annular plate 42 for clamping the rear end of the flange 45 in engagement with the forward end of the hub 12.

What I claim as my invention is:

1. A vehicle wheel having a hub member provided with a fixed flange adjacent the front end thereof, a disk wheel body member sleeved over the hub, said disk having a portion adjacent the inner end thereof clamped to the fixed flange and having the inner edge portions thereof extending rearwardly from the fixed flange and seated upon the hub, and reinforcing ribs for the disk extending diagonally from the portion of the disk seated upon the hub to the outer edge of said first-mentioned portion.

2. A vehicle wheel having a hub member provided with a radially extending fixed flange adjacent the front end thereof, a disk wheel body member having a portion inclined rearwardly and outwardly from the periphery of the fixed flange and provided with an inwardly extending radial portion abutting the fixed flange, said radial portion terminating in an inwardly and rearwardly inclined portion adapted to seat upon the hub, means rigidly securing the radial portion to the fixed flange at circumferentially spaced points, and means for reinforcing the disk including ribs extending inwardly and rearwardly from the forward edge of said outwardly inclined portion and connecting into the portion of the disk seated upon the hub member.

CHARLES W. SINCLAIR.